Oct. 27, 1936.  W. W. REECE  2,058,826
APPARATUS FOR STERILIZING FOOD PRODUCTS
Filed April 27, 1933  4 Sheets-Sheet 4

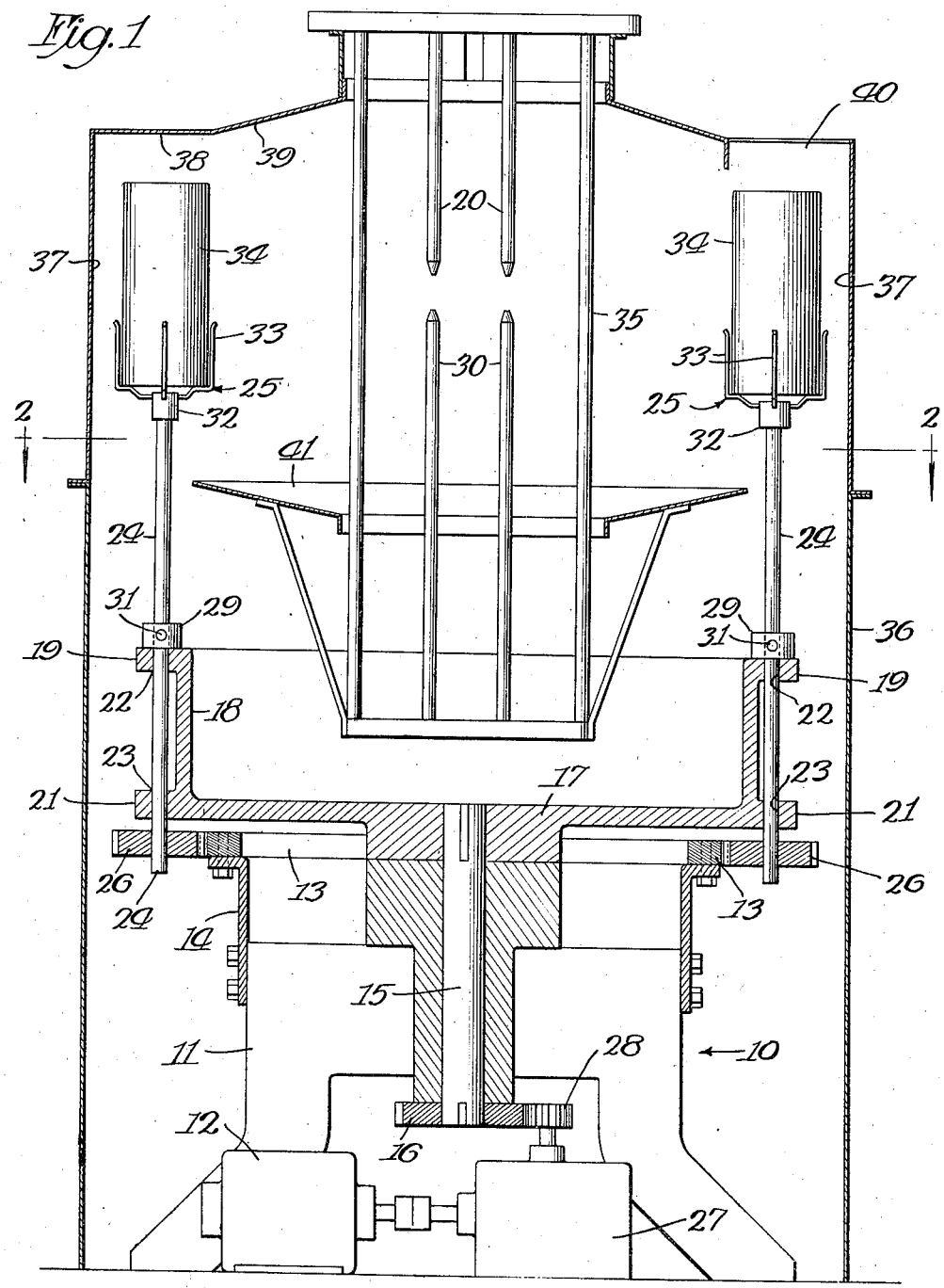

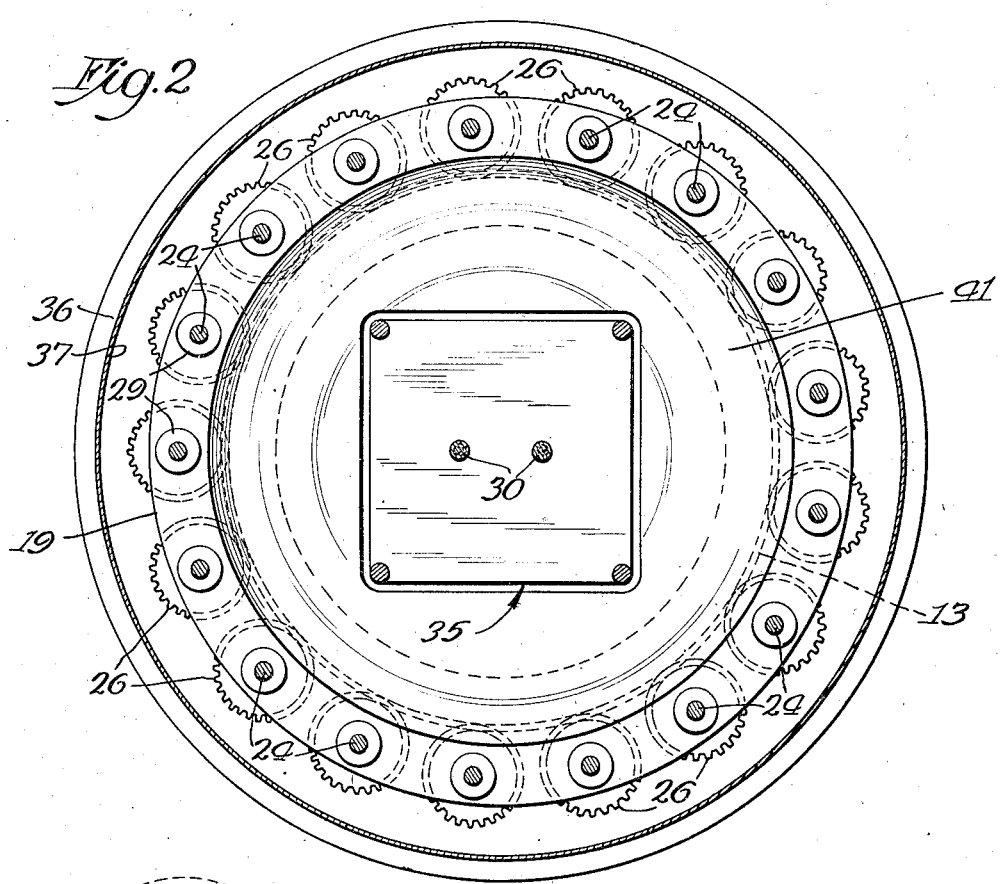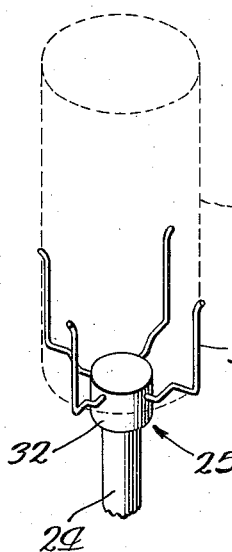

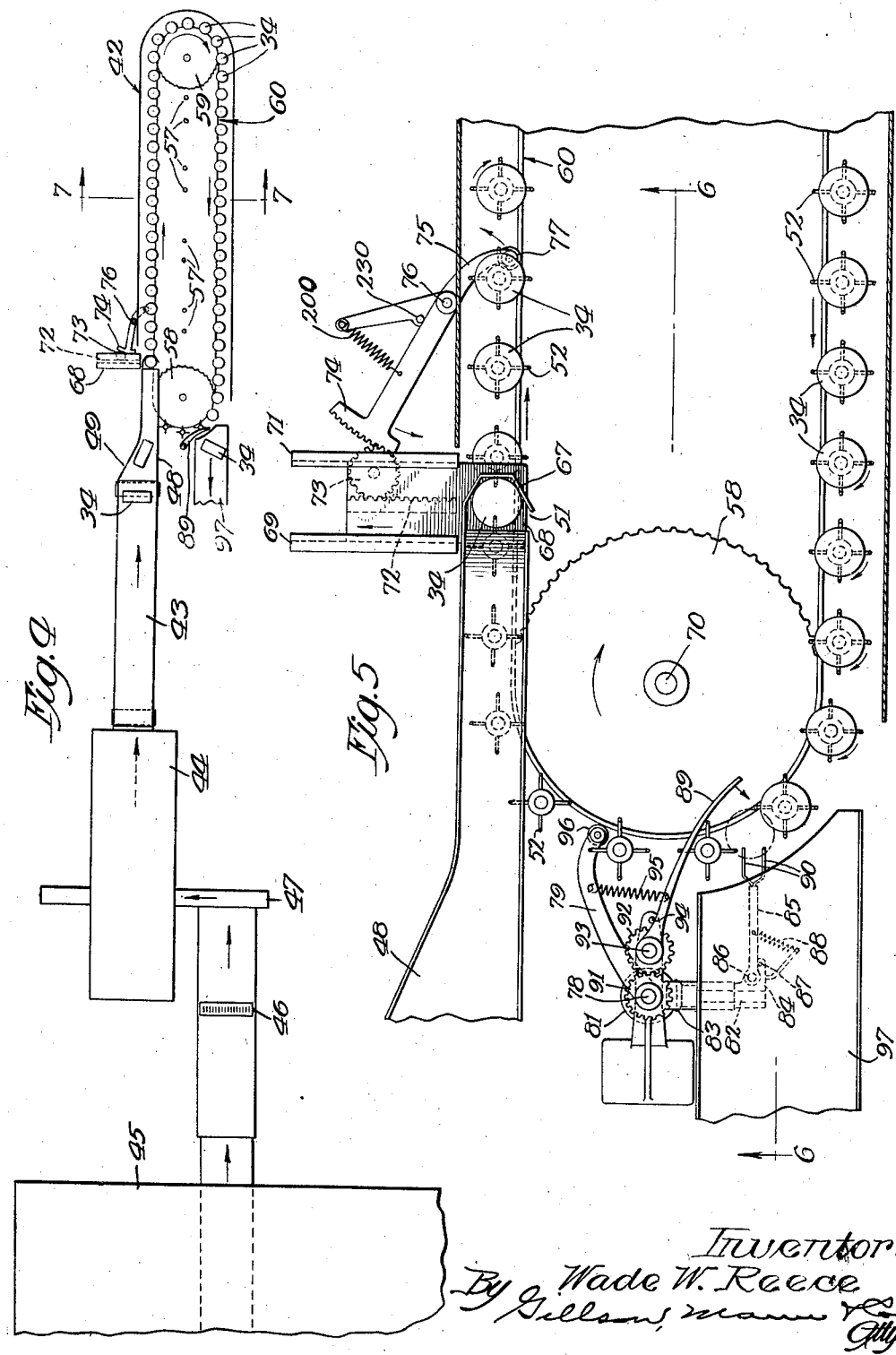

Inventor
Wade W. Reece

Patented Oct. 27, 1936

2,058,826

UNITED STATES PATENT OFFICE 2,058,826

APPARATUS FOR STERILIZING FOOD PRODUCTS

Wade W. Reece, Chicago, Ill., assignor to The W. E. Long Company, Chicago, Ill., a corporation of Illinois Application April 27, 1933, Serial No. 668,165

2 Claims. (Cl. 99—247)

This invention relates to sterilizing food and other products, and, more particularly, to the sterilization of bread and other bakery products.

The principal object of the invention is the provision of a new and improved process for sterilizing bakery and other products and for maintaining the same in sterilized condition until ready for use.

A further object of the invention is the provision of new and improved means for sterilizing food and other products after the same has been enclosed in a suitable wrapper.

A further object of the invention is the provision of a new and improved apparatus for sterilizing food products at a minimum of labor and expense.

Another object of the invention is the provision of a new and improved apparatus for simultaneously sterilizing a plurality of packages of food products.

Other and further objects and advantages of the invention will appear from the following description taken in connection with the accompanying drawings, in which Fig. 1 is a vertical section of the device;

Fig. 2 is a horizontal section of the device on the line 2—2 of Fig. 1;

Fig. 3 is a perspective view of one of the holders;

Fig. 4 is a plan view of a modified form of apparatus with parts broken away;

Fig. 5 is a similar view, but on an enlarged scale, with parts broken away;

Figure 6:
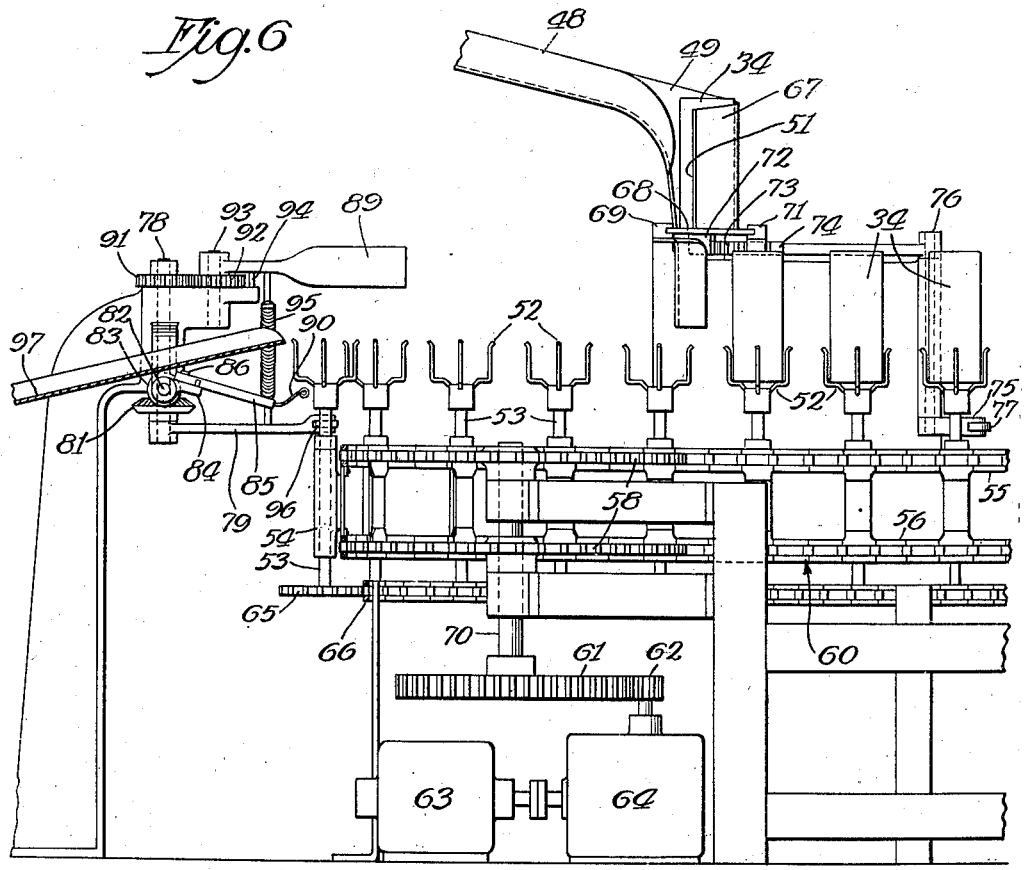
Fig. 6 is a section on the broken line 6—6 of Fig. 5.

It is common practice in the treatment of food products for the general trade to first sterilize the product and then wrap the same in a sealed wrapper. Unless the wrapper is sterilized and the products wrapped in sterilized air, there will be more or less mold spores enclosed with the food.

It has been found by experiment that food products may be enclosed in transparent wrappers, or wrappers pervious to ultra-violet rays, such as cellulose acetate, or the like, and the same sterilized by subjecting the package to the action of ultra-violet rays.

The present invention seeks to provide a new and improved apparatus for sterilizing bakery and other products after the same have been enclosed in wrappers whereby contamination of the product after it is sterilized is avoided, and the product is kept in a fresh condition for long periods of time.

Referring now to the drawings, the reference character 10 represents generally a device for sterilizing packaged food and other products, such as bakery and dairy products, meats and other packaged edibles that are subject to contamination by molding, by the application of ultra-violet rays thereto. For the purpose of disclosing the invention, the devices illustrated will be described as apparatuses for sterilizing packaged bakery products, such as loaves of bread, but it is understood that this is by way of example only.

Referring now to Figs. 1 to 3 of the drawings in which is illustrated, more or less diagrammatically, one embodiment of the invention, the reference character 11 designates the base of the machine within which may be mounted the motor 12 for operating the same. The base is provided with ring gear 13 which is rigidly attached to the cylindrical support 14 attached to and extending above the base 11. Journalled axially within the base is a shaft 15 having a spur gear 16 on its lower end.

Rigidly attached to the upper end of the shaft 15 is a frame 17 which has an upstanding portion 18 provided with laterally extending flanges 19 and 21. The flanges 19 and 21 are provided with a plurality of aligned openings 22 and 23 through which extend the shafts 24 of the supports 25. Keyed to the lower end of each of the shafts 24 is a pinion 26 which meshes with the ring gear 13. The frame 17 is rotated by any suitable means, such as the motor 12 operating through the gear box 27 and pinion 28 which meshes with the gear 16. Collars 29 on the shafts 24 secured by means of the set screws 31 limit downward movement of the shafts 24.

The upper ends of the shaft 24 are each provided with suitable means, as the frame or holder 25, for supporting the products that are to be sterilized. In order that the holder shall offer the minimum amount of obstruction to the ultra-violet rays employed for sterilizing the product, the holder is provided with fingers of a minimum area in cross section. As shown, the frames comprise a base portion 32 rigidly secured to the upper end of the shaft 24 and having fingers 33 offset upwardly from the base for receiving the package, such as a loaf of bread 34, or other article of food, and for supporting the same above the base whereby the sterilizing rays will have access to the lower end of the product.

A suitable source of ultra-violet rays is provided for treating the products. Any suitable mechanism may be employed for this purpose.

A conventional carbon lamp, or lamps, suitable for this purpose are shown at 35 in which the carbons are shown at 20 and 30. Since the details of these lamps constitute no part of the present invention, it is not thought necessary to further illustrate or describe the same. The entire device may be, and preferably is, enclosed in a casing 36. This casing is provided with an opening 40 in one side through which the products are supplied to the supports 25 and removed therefrom. Preferably—though not necessarily—reflectors are provided for reflecting the rays from the lamp on to the packages 34. These reflecting surfaces may be arranged on the sides, as at 37, above, as at 38 and 39, and below the packages, as at 41. By means of this arrangement, the packages are not only subjected to the direct rays from the lamp, but are also subjected to the reflected rays.

The parts are so constructed that when in operation, the frame 17 will revolve about the lamp 35 which remains stationary and the revolution of the frame around the lamp will cause the rotation of the shafts 24 through the cooperation of the pinions 16 and ring gear 13. In this way, all parts of the package will be subjected to the rays from the lamp. The package moves slowly in its revolution about the lamp and also rotates somewhat slowly on its axis, thus giving the operator ample time to replace a treated package with an untreated one, as the support passes the loading station at the opening 40. The operation is continuous and the movements may be speeded up, if desired, to the point when a plurality of operations are required. The device may, if desired, be made of larger capacity and be provided with a plurality of loading and unloading stations, thus speeding up the output.

It has been found by experiment that the rays are most effective if they strike the package normal to the surface of the wrapping material. This is especially true when the package material cellulose acetate, known to the trade as cellophane, is employed for containing the package. The lamp is preferably so adjusted that rays therefrom will fall on the sides of the package normal thereto. The frame 17 may be of any suitable size, depending on the desired capacity of the plant within which the same is used.

In the operation of the device, the frame 17 is rotated and its rotation will cause the frames 25 containing the articles to be sterilized to revolve and at the same time rotate on their axes. As the packages pass the doorway or opening 40, the sterilized packages are removed from the frames 25 and other packages are placed in position on said frames. The parts are preferably so constructed and operated that the articles are sufficiently sterilized during one complete revolution.

While in the apparatus employed a single lamp assembly is used and the bakery products are moved about the lamp for subjecting said products to the ultra-violet rays of said lamp, it is understood that it is immaterial whether the product or the lamp is movable, it being essential only that all parts of the wrapped product be properly subjected to the action of the ultra-violet rays.

In Figs. 4 to 7 is shown a modified form of construction in which the loading and unloading of the packaged product is accomplished automatically. On the drawings, the apparatus is shown more or less diagrammatically and comprises the sterilizing apparatus, designated generally by the reference character 42, which is adapted to be supplied with products by the conveyor 43 from the wrapping machine 44. The wrapping machine may be of the usual or any well-known construction. If desired, the product, as, for instance, bread, may be conducted from the cooling tunnel 45 through the slicing machine 46 and from the slicing machine the sliced loaves may be conducted automatically by the conveyor 47 to the wrapping machine 44. Where a slicing machine is not employed, the bakery products may be conveyed directly from the cooling chamber 45 to the wrapping machine 44 in any suitable manner. Since the details of the cooling chamber 45, the slicing machine 46, the wrapping machine 44 and the associated conveyors constitute no part of the present invention, it is not thought necessary to further illustrate or describe the same. Any of the commercial types of these devices may be employed.

Suitable means are provided for automatically turning the loaves 34 to upright position after they have passed through the wrapping machine 44. The wrapped loaves are conducted to the forward end of the conveyor 43 where they are deposited on a chute 48. This chute is inclined downwardly and is constructed in such a manner as to cause the packaged product in its movement along the chute to be turned to upright position by the time it reaches the receptacle 51 at the end of the chute. Any suitable mechanism may be employed for accomplishing this function. As shown, one side wall 49 of that portion of the chute leading downwardly toward the receptacle 51 is inclined toward the other side wall so one end of the loaves 34 will contact the wall 49 as the loaves slide down this chute with the result that the opposite end of the loaf will travel ahead, thereby turning the loaf through an angle of 90°, as indicated in full lines on Fig. 4 of the drawings. The loaf sliding down the remainder of the chute endwise will be deposited in a vertical position in the receptacle 51. The receptacle 51 is positioned vertically above the endless carrier for depositing the products in the package supports 52, as will presently appear.

A plurality of package holders or supports are provided as in the construction described above, but the mechanism for rotating these holders and for causing the same to revolve about the ultra-violet ray lamp is different. In this form of construction, the package holders, or supports, 52 are supported by the rods 53, which in turn are rotatably mounted in sleeves or bearings 54. The bearings 54 are attached at their upper portion to an endless chain 55, and at their lower portion to the corresponding endless chain 56. The chains 55 and 56 constitute an endless carrier 60 that causes the holders 52 to revolve about the lamps 57. The chains are operated by a pair of sprockets 58 at one end of the gear and are trained about a pair of sprockets 59 at the other end of the gear (see Fig. 4 of the drawings). The sprockets 58 are fast on the shaft 10 which is rotated by the gear 61 and pinion 62 from a suitable motor 63 through the gear box 64. The endless carrier conducts the holders 52 and with them the products to be sterilized around lamps 57 that emit ultra-violet rays. In order to expose the entire surface of the product to the ultra-violet rays, means are provided for rotating the holders 52 as the same revolve about the lamps. The holders 52 are caused to rotate by the engagement of the sprocket wheel 65 rigidly attached to the lower end of the shaft 53 and engaging a fixed gear rack 66 (see Fig. 7).

It is desirable that the packaged articles be automatically deposited in the supports or holders 52. Any suitable mechanism may be employed for performing this function. In the form of construction selected to illustrate one embodiment of this feature of the invention, the inner end of the chute 48 is closed, as by means of the angular walls 67 (Fig. 5) which form the receptacle 51 for receiving the packaged article, such as a loaf of bread 34. The bottom wall, or floor, 68 of the receptacle 51 is movable and means are provided for removing this floor from beneath the article in timed relation to the movement of the endless carrier, as will presently appear. Any suitable means may be employed for operating this floor.

In the form of construction shown, the floor 68 (see Fig. 5) is slidably mounted in guides 69 and 71. The bottom wall, or floor, 68 on its lower side is provided with a rack 72 which is engaged by a corresponding pinion 73, which in turn is operated by a quadrant 74. The quadrant 74 is provided with an arm 75 that is pivoted as at 76 and its free end is adapted to be engaged successively by the shafts 53 during the operation of the device. The arm 75 may be provided with an anti-friction roller 77, as clearly shown in Fig. 5 of the drawings. The parts are so constructed and proportioned that the floor 68 will be removed from beneath the packaged article 34 when one of the holders 52 is directly beneath the package. A suitable spring 200 and stop 230 will position the free end of the arm 76 in the path of the shafts 53 when the same is released.

Suitable means are provided for removing the package from the endless carrier after the same has been treated. Any suitable mechanism may be employed for this purpose. In the form of construction shown, mechanism is provided for elevating the loaf from the holder and other means are provided for causing the loaf to be deposited in a gravity chute. In the form of construction selected to illustrate one embodiment of this feature, a vertical shaft 78 (see Fig. 5) is mounted in suitable bearings at what might be termed "the discharge station." This shaft has mounted thereon a trip arm 79 which is adapted to be engaged by the holder shafts 53 for operating the discharge mechanism. The shaft 78 is provided with a bevelled gear 81 for operating a stub shaft 82 through a suitable pinion 83 on one end of said shaft. The opposite end of the stub shaft 82 is provided with a sleeve 84 to which is connected the elevator arm 85. The outer end of the arm 85 is provided with a pair of fingers 90 which are adapted to engage beneath the bakery product carried by the holder 52 for elevating the same. In order that the arm 85 may move with the shaft 53 of the holders while it is elevating the package, the same is pivoted at 86 to said sleeve. A stop 87 limits the return movement of the arm 85 and a spring 88 is adapted to return the same to its inoperative position upon its release.

A blade 89 is provided for striking the product after it has been elevated from the holders by the arm 85 for removing the package from the holder and for depositing the same in a proper chute. This blade is operated through the gears 91 and 92 on the shaft 78 and a shaft 93 to which the blade 89 is rigidly connected. A stop 94 limits the return movement of the blade and the spring 95 connecting the arm 79, and the blade 89 returns the parts to normal position after release.

The parts are so constructed that they operate in timed relation, whereby one of the wire supports of the holder 52 will be received between the two fingers 90 of the elevator arm 85 for removing the package from the holders in succession as they revolve about the source of ultra-violet rays.

In the operation of the discharge mechanism, the shaft 53 of each holder as it comes around will contact the outer end of the arm 79 which may be provided with an anti-friction roller 96. As the endless carrier with the shaft 53 advances, it will rotate the arm 79 counter clockwise and through the movement of the gears 81 and 83 will cause the outer end of the arm 85 to be elevated whereby the fingers 90 will engage beneath the loaf and elevate the same from the holders 52, and at the instant the product is nearing the limit of its movement, the blade 89 is caused to strike the product and discharge or project the same into the inclined chute 97.

Figure 7:
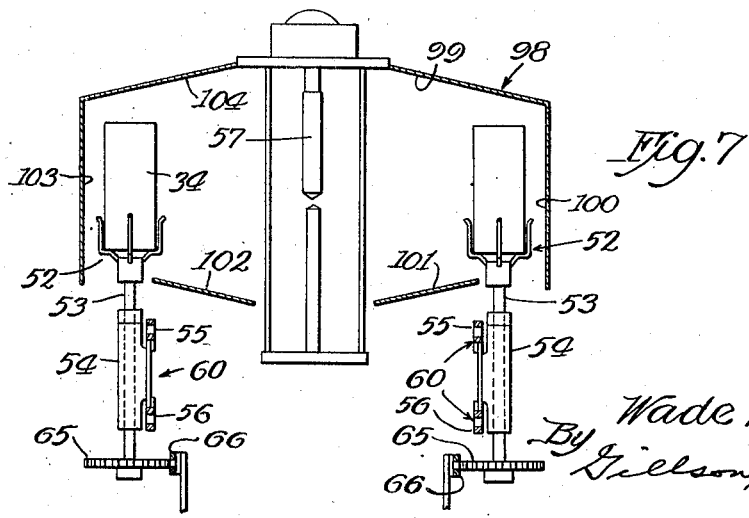
Fig. 7 is a section on the line 7—7 of Fig. 4, on an enlarged scale.

The sterilizing mechanism is preferably housed within a suitable casing 98 and in order to increase the efficiency of the lamps, the inner surfaces of the casing 98 may be provided with mirrors or mirror surfaces, as at 99, 100, 101, 102, 103 and 104 for reflecting the rays onto the product from above, below and from the sides, as indicated in Fig. 7 of the drawings.

In the operation of the entire device, the food product is wrapped in a wrapper pervious to germicidal rays. After the product passes through the cooling tunnel, the slicing machine—if the product is sliced—and the wrapping machine, it is delivered by the inclined chute 48 to the receptacle 51 in position to be deposited in the holder. At the instant the holder is in position beneath the package, the bottom wall 68 is removed from beneath the product and the latter falls by gravity into the holder 52. The product is conducted by the endless carrier around the lamps 57 and is rotated by the holders during its revolution about the lamps. When it reaches the discharge station, the trip arm 79 operates the mechanism in timed relation to the movement of the endless carrier so that the fingers 90 will pass upwardly between the retaining fingers of the holder and the blade 89 will discharge the product into the chute 97.

While a carbon lamp is employed as a source of ultra-violet rays for sterilizing products wrapped in transparent wrappers, it is understood that any suitable means may be employed that will emit germicidal rays which will sterilize the product through the package material whether the material is transparent or not, it being only necessary that the rays penetrate the wrapper or package material and sterilize the product enclosed therein.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim as my invention:

1. In an apparatus for sterilizing bakery products wrapped in transparent material, an ultra-violet ray lamp, means including wire fingers having outward offsets between their ends for supporting thereon bakery products wrapped in a wrapper of transparent material within the direct path of said rays, means for changing the relative position of said lamp and product whereby all sides except the top and bottom of said product will be subjected to said direct rays, means for continuously revolving said products about said lamp and for rotating the same about vertical axes, means for enclosing said lamp and product, and reflecting surfaces within the enclosure and spaced from the supporting means for reflecting said rays onto the upper and lower surfaces of said product whereby substantially the entire surface of said product will be subjected to ultra-violet rays.

2. In an apparatus for sterilizing bakery products wrapped in transparent material, an ultra violet ray lamp, means for supporting bakery products wrapped in a wrapper of transparent material within the direct path of said rays, said means being of such construction and supporting said products in such manner that reflected rays from said lamp will impinge on substantially the entire top and bottom surfaces of said products, means for changing the relative position of said lamp and product whereby all sides except the top and bottom of said product will be subjected to said direct rays, means for continuously revolving said products about said lamp and for rotating the same about vertical axes, means for enclosing said lamp and product, and reflecting surfaces within the enclosure and spaced from the supporting means for reflecting said rays onto the upper and lower surfaces of said product whereby substantially the entire surface of said product will be subjected to ultra violet rays.

WADE W. REECE.